United States Patent Office 3,428,695
Patented Feb. 18, 1969

3,428,695
HIGH TEMPERATURE, SHORT CONTACT-TIME PYROLYSIS OF DICHLOROFLUOROMETHANE WITH METHANE
John Richard Soulen, Narberth, and William Ford Schwartz, King of Prussia, Pa., assignors to Pennsalt Chemicals Corporation, Philadelphia, Pa., a corporation of Pennsylvania
No Drawing. Filed Oct. 12, 1965, Ser. No. 495,298
U.S. Cl. 260—653    8 Claims
Int. Cl. C07c 19/08, 21/18, 3/46

ABSTRACT OF THE DISCLOSURE

A mixture of dichlorodifluoromethane and methane is pyrolyzed at a temperature within the range of about 1100° C. to about 2000° C. for a period of from 0.0003 to 0.05 second to produce fluoroethylenes and chlorofluoroethanes.

---

This invention relates to a method for converting dichlorodifluoromethane to other fluorinated organic compounds and more particularly relates to a high temperature reaction between dichlorodifluoromethane and methane to produce fluorinated ethylenes and fluorinated ethanes, e.g., vinylidene fluoride, tetrafluoroethylene, 1-chloro-1,1-difluoroethane and monochloropentafluoroethane.

In U.S. Patent No. 2,687,440, F. C. McGrew and E. H. Price disclose a process wherein dichlorodifluoromethane ($CCl_2F_2$) and methane ($CH_4$) are reacted at from 400° C. to 1000° C. to produce, as the major product, vinylidene fluoride ($CH_2=CF_2$) and as secondary products, tetrafluoroethylene ($CF_2=CF_2$) and monochlorodifluoromethane ($CHClF_2$). The amount of $CHClF_2$ in the converted reaction products of the process described in said patent varies from about 13 to 36 mole percent thereof (calculated by excluding unreacted $CCl_2F_2$ as a reaction product). U.S. Patent 2,687,440 is explicit in stating that the operable limits of the temperatures of the reacting vapors is from about 400° C. to 1000° C. and that "at about 1000° C. increasing decomposition and formation of less desirable products occurs as higher and higher temperatures are employed, with the result that the process becomes impractical."

It has now been discovered that reacting $CCl_2F_2$ with $CH_4$ at temperatures in excess of 1000° C., i.e., at temperatures within the range of 1100° C. to about 2000° C., unexpectedly produces a mixture wherein the products are fluorinated ethanes as well as fluorinated ethylenes. However, the period of the reaction embodied herein very short and should not exceed about 0.05 second. Reaction within the range of 1100° to about 1350° C. favors the production of $CH_2=CF_2$, monochloropentafluoroethane ($CClF_2CF_3$), and 1-chloro-1,1-difluoroethane ($CH_3CClF_2$). Reaction at temperatures in excess of about 1350° C. favors the preparation of $CH_2=CF_2$ and $CF_2=CF_2$. Contrary to the teachings of the prior art, it has been found that the conversion of the $CCl_2F_2$ starting material to other fluorinated organic products increases with increasing temperature and that the yields of the fluorinated ethylene products are highest at temperatures above about 1350° C. It is quite surprising that the high-temperature reaction of $CCl_2F_2$ and $CH_4$ embodied herein also produces fluorinated ethanes but only a very minor amount of $CHClF_2$, a major product of the low-temperature process of U.S. 2,687,440. The fluorinated ethylene products of the process embodied herein, $CH_2=CF_2$ and $CF_2=CF_2$, are well known monomers used in the production of valuable polymers. The fluorinated ethane products, $CH_3CClF_2$ and $CClF_2CF_3$, are well known and valuable refrigerants.

As stated above, the reaction of $CCl_2F_2$ and $CH_4$ is carried out according to this invention at temperatures within the range of 1100° C. to about 2000° C. In combination with said high reaction temperatures, very short reaction periods are used, that is, reaction times of the order of about 0.0003 to 0.05 second, preferably in the range of about 0.0006 to about 0.025 second. At reaction times of the usual order of magnitude used in reactions of this type, i.e., of the order of about 0.1 to 10 seconds, the process of this invention is inoperative because of considerable degradation of the reactants and reaction products. As used herein, reaction time is defined as follows:

reaction time (seconds) =

$$\frac{\text{heated reactor volume}}{\text{volume of gas per second (calculated at reaction temperature and pressure) fed to reactor}}$$

The short reaction times indicated above for the method of this invention correspond to very high space velocities ranging from about 3000 to about 100,000 per hour which permit a high rate of feed of reactants and reduce reactor volume needed. Space velocity is defined as volumes of reactants (measured at standard temperature and pressure (STP), i.e., 0° C. and 760 mm. Hg) per volume of heated reactor per hour. This is in sharp contrast to the much lower space velocities previously employed in the reaction of $CCl_2F_2$ and $CH_4$, on the order of about 100 per hour (in the working examples of U.S. 2,687,440, reaction times range from 2.7 to 6.4 seconds).

The reaction pressure in the present process is not critical and may be atmospheric, sub-atmospheric, or super-atmospheric. Super-atmospheric pressures may range, e.g., up to about 10 atmospheres. However, atmospheric and sub-atmospheric pressure operation will generally be found most convenient. As a practical limit, pressures lower than about one mm. Hg abs. are not recommended. Preferred operating pressures will generally range from about 10 mm. Hg to atmospheric pressure.

The ratio of $CCl_2F_2$ to $CH_4$ in the feed mixture is, in general, substantially equimolecular, however variations in the molar reactant ratio ($CCl_2F_2:CH_4$) of the order of 0.5:1 to 1:5 have no substantial effects on the conversions and yields.

The reaction is conveniently carried out by continuously passing a stream of the aforesaid feed mixture through an elongated tube preferably having a high ratio of wall area to cross-sectional area so that heat may be rapidly and continuously transferred from the heated reactor walls to the gaseous reactants. The heated reactor wherein the $CCl_2F_2$ and $CH_4$ are in contact should be constructed of materials resistant to attack by the reactants and reaction products at the high operating temperatures. Materials of this type include for example, inert graphite, boron nitride, platinum, platinum alloys such as platinum-rhodium, common metals lined with platinum or platinum alloys, and nickel alloys. The reactor can be heated to the desired reaction temperatures in any suitable manner such as by electrical induction heating or by placing the reactor in an electrically heated furnace.

amounts, in contrast to the process of U.S. Patent No. 2,687,440 where, as stated earlier, employing temperatures of about 400 to 1000° C., $CHClF_2$ is produced as a major product, ranging from about 13 to 36 mole percent of the converted reaction products (i.e., excluding the unreacted $CCl_2F_2$).

TABLE I

| Ex. | Reaction Conditions | | | | | Percent Conv. of $CCl_2F_2$ | Weight Percent in Recovered Converted Product of— | | | | |
|---|---|---|---|---|---|---|---|---|---|---|---|
| | Molar Ratio of $CCl_2F_2$ to $CH_4$ | Feed Rate of $CCl_2F_2+CH_4$, gms./mm. | Pressure, mm. Hg Abs. | Temp., ° C. | Contact time, seconds | | $CH_2=CF_2$ | $CF_2=CF_2$ | $CHClF_2$ | $CH_3CClF_2$ | $CClF_2CF_3$ |
| 1 | 0.99 | 0.292 | 27 | 1,040 | 0.0044 | 1.8 | 4.8 | 3.0 | 2.8 | nil | [1] 11.4 |
| 2 | 1.0 | 0.171 | 20 | 1,100 | 0.025 | 4.3 | 1.9 | 7.6 | 4.3 | 35.7 | 30.9 |
| 3 | 0.74 | 0.244 | 38 | 1,125 | 0.0068 | 11.7 | 31.7 | 4.8 | 2.3 | 20.4 | 9.4 |
| 4 | 1.0 | 0.251 | 22 | 1,240 | 0.0037 | 26.9 | 0.9 | 3.8 | 1.3 | 63.6 | Nil |
| 5 | 0.98 | 0.206 | 26 | 1,385 | 0.0048 | 50.2 | 78.6 | 12.9 | 1.4 | 3.7 | Nil |
| 6 | 0.90 | 0.268 | 25 | 1,420 | 0.0034 | 59.9 | 55.0 | 19.5 | Nil | 20.5 | Nil |
| 7 | 0.74 | 0.226 | 25 | 1,500 | 0.0038 | 83.0 | 54.3 | 27.6 | 1.1 | 5.6 | Nil |

[1] In example 1, principal products were $CF_4$ (18.2 wt. percent), $C_4F_8$ (24.9 %) and $CHCl_3$ (20.6%).

The products of the reaction passing from the reactor are cooled and usually will be scrubbed in caustic solution or other alkaline solution to remove acidic inorganic by-products such as HCl and HF. The organic products are separated from the reaction mixture in a conventional manner by fractional distillation. The unreacted $CCl_2F_2$ can, of course, be recovered for recycling purposes.

EXAMPLES

In the experiments herein described, illustrative specific embodiments of the invention are set forth and compared to an example (No. 1) wherein the reaction temperature is below the minimum required for the present process.

A gaseous mixture of $CCl_2F_2$ and $CH_4$ is passed continuously at a measured rate through a ⅛" I.D. x ½" O.D. x 13" long, inert graphite tube reactor centered within a 2" diameter "Vycor" high-silica glass tube, 15" long. The graphite tube reactor is inductively heated with a 3¼" long load coil of 12 turns of ¼" copper tubing about the "Vycor" tube, the power for said coil supplied by a high frequency generator with a maximum output of 7.5 kilowatts operating at 450 kilocycles. The effective reaction zone in the tube is thus 3¼". The temperature of the reactor is measured with an optical pyrometer focused on the center of the heated portion of the tube. Examination of the inert graphite reactor after repeated runs therein reveals that its inner surface is unaffected by the passage of the hot gases therethrough.

The product mixture passes from the reactor and is condensed in a trap cooled with liquid nitrogen. The condenser is vented to a mechanical vacuum pump which maintains the sub-atmospheric reaction pressure employed in these examples. After completion of the run, the reaction products are warmed to room temperature and transferred to an evacuated stainless steel cylinder. The reaction products are then passed through a series of scrubbers containing aqueous solutions of sodium hydroxide and hydrogen peroxide to remove inorganic by-products. The organic reaction products are analyzed using gas-liquid chromatographic and infra-red analyses techniques.

The data from seven runs are summarized in Table I. In addition to the components listed in the "product" column of Table I, the reaction products contain unreacted $CCl_2F_2$ and varying amounts of $CF_4$, $CHF_3$, $CCl_3F$, $CHCl_3$, $CH_3CF_3$, $CF_3CF_3$ and $C_4F_8$ (perfluorocyclobutane). Substantially all of the $CH_4$ generally is consumed in the reaction. The data show that in all the examples $CHClF_2$ is produced in only small or trace amounts, in contrast to the process of U.S. Patent No. 2,687,440 where, as stated earlier, employing temperatures of about 400 to 1000° C., $CHClF_2$ is produced as a major product, ranging from about 13 to 36 mole percent of the converted reaction products (i.e., excluding the unreacted $CCl_2F_2$).

It is understood that the foregoing illustrative examples should not be construed as limitative of the scope of the invention which is defined by the appended claims.

We claim:
1. The method of converting dichlorodifluoromethane to other fluorinated organic compounds including at least one fluoroethylene selected from the group consisting of vinylidene fluoride and tetrafluoroethylene and at least one chlorofluoroethane selected from the group consisting of monochloropentafluoroethane and 1-chloro-1,1-difluoroethane which comprises reacting dichlorodifluoromethane with methane at a temperature of from 1100° C. to about 2000° C., wherein the reaction time is from about 0.0003 to 0.05 second.

2. The method of claim 1 wherein the contact time is from about 0.0006 to 0.025 second.

3. The method of claim 1 wherein the reaction temperature is from 1100° C. to about 1350° C.

4. The method of claim 3 wherein the contact time is from about 0.0006 to 0.025 second.

5. The method of claim 1 wherein the reaction temperature is from about 1350° C. to about 2000° C.

6. The method of claim 5 wherein the contact time is from about 0.0006 to 0.025 second.

7. The method of converting dichlorodifluoromethane to other fluorinated organic compounds including at least one fluoroethylene selected from the group consisting of vinylidene fluoride and tetrafluoroethylene and at least one chlorofluoroethane selected from the group consisting of monochloropentafluoroethane and 1-chloro-1,1-difluoroethane which comprises mixing dichlorodifluoromethane with methane and passing said mixture through a tube heated to a temperature of from 1100° C. to about 2000° C. wherein the contact time is within the range of about 0.0003 to 0.05 second.

8. The method of claim 7 wherein the contact time is from about 0.0006 to 0.025 second.

References Cited

UNITED STATES PATENTS 2,687,440   8/1954   McGrew et al. _____ 260—653
3,188,356   6/1965   Hauptschein et al. __ 260—653.5

FOREIGN PATENTS 699,781   12/1964   Canada.

DANIEL D. HORWITZ, *Primary Examiner.*

U.S. Cl. X.R.

260—653.3